US009559552B2

(12) United States Patent
Harwath

(10) Patent No.: US 9,559,552 B2
(45) Date of Patent: Jan. 31, 2017

(54) COAXIAL CABLE AND CONNECTOR WITH CAPACITIVE COUPLING

(71) Applicant: CommScope Technologies LLC, Hickory, NC (US)

(72) Inventor: Frank A. Harwath, Naperville, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/823,485

(22) Filed: Aug. 11, 2015

(65) Prior Publication Data
US 2016/0049740 A1 Feb. 18, 2016

Related U.S. Application Data

(60) Provisional application No. 62/036,258, filed on Aug. 12, 2014.

(51) Int. Cl.
*H02J 50/05* (2016.01)

(52) U.S. Cl.
CPC ...................................... *H02J 50/05* (2016.02)

(58) Field of Classification Search
USPC .................. 439/579, 578; 333/24 C, 246
See application file for complete search history.

(56) References Cited

U.S. PATENT DOCUMENTS

| | | | | |
|---|---|---|---|---|
| 5,977,841 A * | 11/1999 | Lee | .......................... | H01P 1/045 333/24 C |
| 6,198,367 B1 * | 3/2001 | Matsunaga | ......... | H01P 1/20363 333/246 |
| 6,525,620 B1 * | 2/2003 | Barabash | ............. | H01Q 9/0407 333/24 C |
| 7,665,998 B2 * | 2/2010 | Kressner | ................ | H01R 12/57 439/579 |
| 8,134,424 B2 * | 3/2012 | Kato | ...................... | H01R 24/44 333/24 C |
| 8,350,638 B2 * | 1/2013 | White | ..................... | H01P 5/028 333/24 C |
| 8,894,439 B2 * | 11/2014 | Van Swearingen | .... | H01R 12/79 439/378 |
| 2004/0094328 A1 * | 5/2004 | Fjelstad | ............... | H01R 9/0515 174/251 |
| 2011/0080057 A1 * | 4/2011 | Bowman | ............ | H01R 13/6683 307/149 |
| 2011/0130034 A1 * | 6/2011 | Montena | ............ | H01R 13/6683 439/578 |
| 2014/0134875 A1 * | 5/2014 | Van Swearingen | .... | H01R 24/40 439/578 |
| 2014/0370747 A1 * | 12/2014 | Vaccaro | ................ | H01R 24/42 439/578 |
| 2015/0118897 A1 * | 4/2015 | Paynter | .................. | H01R 24/54 333/24 C |
| 2015/0118898 A1 * | 4/2015 | Paynter | ............... | H01R 9/0503 333/24 C |

(Continued)

*Primary Examiner* — Alexander Gilman
(74) *Attorney, Agent, or Firm* — Myers Bigel P.A.

(57) ABSTRACT

A connector for a plurality of coaxial cables includes: a conductive common base with a contact surface; a plurality of conductive contact pads embedded in the common base, each of the plurality of contact pads having a contact surface; and a plurality of dielectric pads embedded in the common base, each of the dielectric pads surrounding a respective contact pad to isolate the respective contact pad from the common base.

15 Claims, 6 Drawing Sheets

(56) References Cited

U.S. PATENT DOCUMENTS

| | | | |
|---|---|---|---|
| 2015/0118899 A1* | 4/2015 | Hugel | H01R 24/542 439/578 |
| 2016/0049740 A1* | 2/2016 | Harwath | H02J 50/05 439/579 |
| 2016/0079688 A1* | 3/2016 | Harwath | H01R 4/26 439/578 |

* cited by examiner

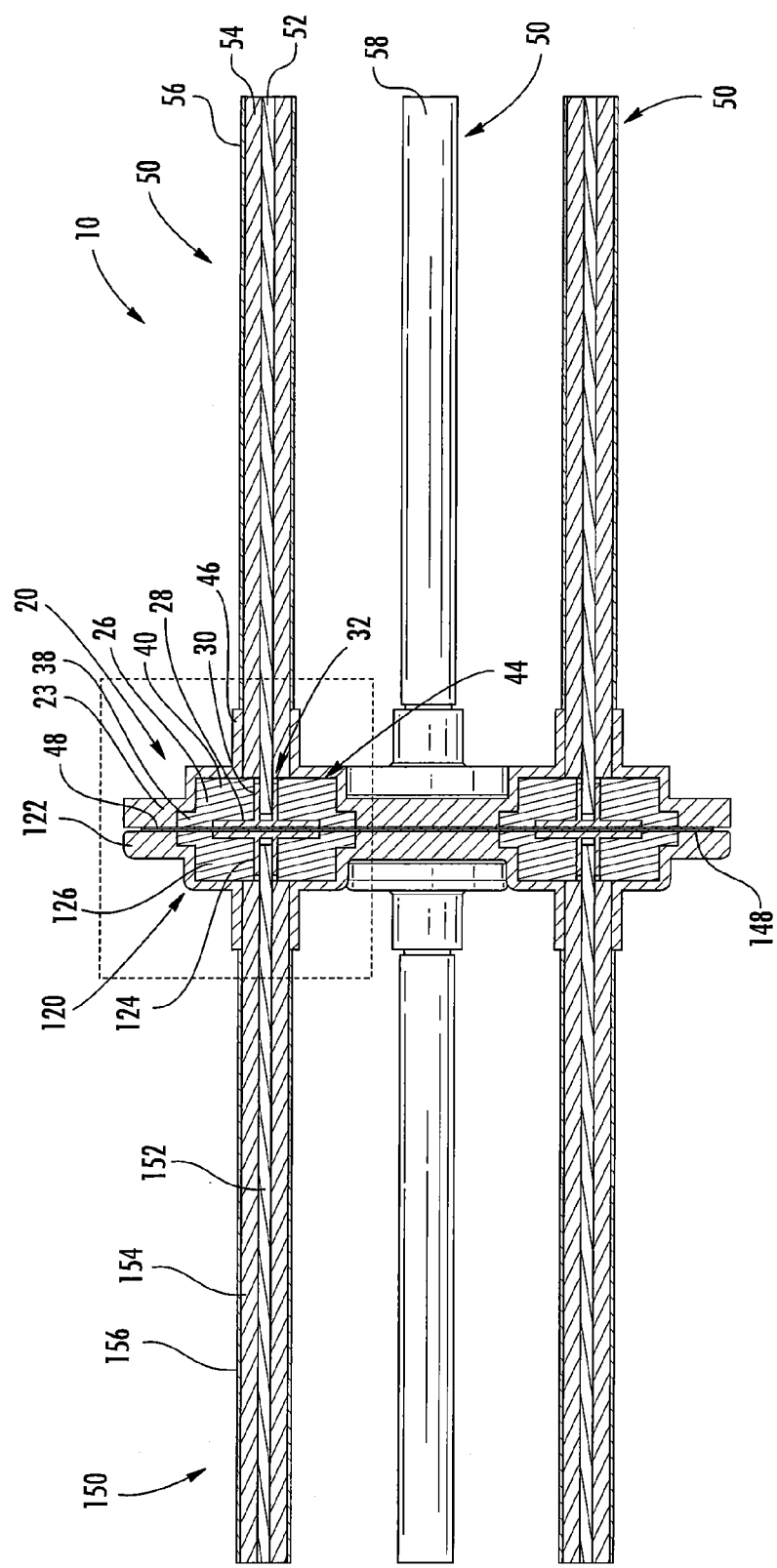

COAXIAL CABLE AND CONNECTOR WITH CAPACITIVE COUPLING

RELATED APPLICATION

The present invention claims the benefit of and priority from U.S. Provisional Patent Application No. 62/036,258, filed Aug. 12, 2014, the disclosure of which is hereby incorporated herein in its entirety.

FIELD OF THE INVENTION

The present invention is directed generally to electrical cable connectors, and more particularly to coaxial connectors for electrical cable.

BACKGROUND OF THE INVENTION

Coaxial cables are commonly utilized in RF communications systems. A typical coaxial cable includes an inner conductor, an outer conductor, a dielectric layer that separates the inner and outer conductors, and a jacket that covers the outer conductor. Coaxial cable connectors may be applied to terminate coaxial cables, for example, in communication systems requiring a high level of precision and reliability.

Coaxial connector interfaces provide a connect/disconnect functionality between (a) a cable terminated with a connector having a particular connector interface and (b) a corresponding connector with a mating connector interface mounted on an apparatus or on another cable. Typically, one connector will include a structure such as a pin or post connected to an inner conductor and an outer conductor connector body connected to the outer conductor; these are mated with a mating sleeve (for the pin or post of the inner conductor) and another outer conductor connector body of a second connector, wherein one of the outer conductor bodies fits within the other outer conductor body Coaxial connector interfaces often utilize a threaded coupling nut or other retainer that draws the connector interface pair into secure electro-mechanical engagement when the coupling nut (which is captured by one of the connectors) is threaded onto the other connector.

Passive Intermodulation Distortion (PIM) is a form of electrical interference/signal transmission degradation that may occur with less than symmetrical interconnections and/or as electro-mechanical interconnections shift or degrade over time. Interconnections may shift due to mechanical stress, vibration, thermal cycling, and/or material degradation. PIM can be an important interconnection quality characteristic, as PIM generated by a single low quality interconnection may degrade the electrical performance of an entire RF system. Thus, the reduction of PIM via connector design is typically desirable.

One manner of addressing PIM is to create connectors that capacitively couple when connected, rather than galvanically coupling through direct electrical contact in the manner of conventional connectors. In one example, the inner conductor post of one connector is covered with a dielectric layer, as is the outer surface of one of the outer conductors. When the two connectors are engaged, the dielectric layers insulate the conductors from each other, thereby creating a capacitive coupling between conductors. Capacitively coupled connectors may decrease PIM caused by minute debris contaminating the metallic connection normally found in mating RF connectors. Because physical contact is not required to couple RF energy through the interfaces, a major cause of contact debris, namely the contact force and wiping of the interfaces necessary for stable contact resistance, can be eliminated. An exemplary set of connectors of this type is shown in U.S. patent application Ser. No. 14/102,042, filed on Dec. 10, 2013, the disclosure of which is hereby incorporated herein in its entirety. However, other designs that employ capacitive coupling may also be desirable.

SUMMARY

As a first aspect, embodiments of the invention are directed to a connector for a plurality of coaxial cables. The connector comprises: a conductive common base with a contact surface; a plurality of conductive contact pads embedded in the common base, each of the plurality of contact pads having a contact surface; and a plurality of dielectric pads embedded in the common base, each of the dielectric pads surrounding a respective contact pad to isolate the respective contact pad from the common base.

As a second aspect, embodiments of the invention are directed to an assembly of coaxial cable connectors comprising a first connector and a second connector. The first connector comprises: a first conductive common base with a contact surface; a plurality of first conductive contact pads embedded in the first common base, each of the plurality of first contact pads having a contact surface; and a plurality of first dielectric pads embedded in the first common base, each of the first dielectric pads surrounding a respective first contact pad to isolate the respective first contact pad from the first common base. The second connector comprises: a second conductive common base with a contact surface; a plurality of second conductive contact pads embedded in the second common base, each of the plurality of second contact pads having a contact surface; and a plurality of second dielectric pads embedded in the second base, each of the second dielectric pads surrounding a respective second contact pad to isolate the respective contact pad from the second common base. A dielectric layer overlies the first common base and the plurality of first contact pads. The first connector and the second connector are arranged such that the contact surface of the first common base confronts the contact surface of the second common base separated by the dielectric layer, and each of the contact surfaces of the first contact pads confronts a respective contact surface of the second contact pads separated by the dielectric layer.

As a third aspect, embodiments of the invention are directed to a connector for a plurality of coaxial cables, comprising: a conductive base with a generally flat contact surface; at least one conductive contact pad embedded in the common base, the contact pad having a generally flat contact surface; and at least one dielectric pad embedded in the base, the dielectric pad surrounding the contact pad to isolate the contact pad from the base; and a dielectric layer the overlies the contact surface of the base and the contact surface of the contact pad.

As a fourth aspect, embodiments of the invention are directed to an assembly of coaxial cable connectors, comprising a first connector and a second connector. The first connector comprises: a first conductive base with a contact surface; at least one first conductive contact pad embedded in the first base, the first contact pad having a generally flat contact surface; and at least one first dielectric pad embedded in the first base, the first dielectric pad surrounding the first contact pad to isolate the first contact pad from the first base. The second connector comprises: a second conductive base with a contact surface; at least one second conductive contact pad embedded in the second base, the plurality of second contact pads having a generally flat contact surface; and at least one second dielectric pad embedded in the second base, the second dielectric pad surrounding the second contact pad to isolate the second contact pad from the second base. A dielectric layer overlies the first base and the first contact pad. The first connector and the second connector are arranged such that the contact surface of the first base confronts the contact surface of the second base separated by the dielectric layer, and the contact surface of the first contact pad confronts the contact surface of the second contact pad separated by the dielectric layer.

As a fifth aspect, embodiments of the invention are directed to a connector for transmitting an RF signal, comprising: a conductive base with a contact surface; a contact pad embedded in the base; a dielectric pad embedded in the base to isolate the contact pad from the base; and a dielectric layer overlying the contact surface of the base and the contact pad.

BRIEF DESCRIPTION OF THE FIGURES

FIG. 4 is a section view of the assembly of FIG. 3.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the figures, a coaxial cable assembly, designated broadly at 10, is shown in FIGS. 1-4A. The assembly 10 (see FIG. 3) includes a first connector 20 and a second connector 120. These connectors 20, 120 are described in greater detail below.

Figure 1:
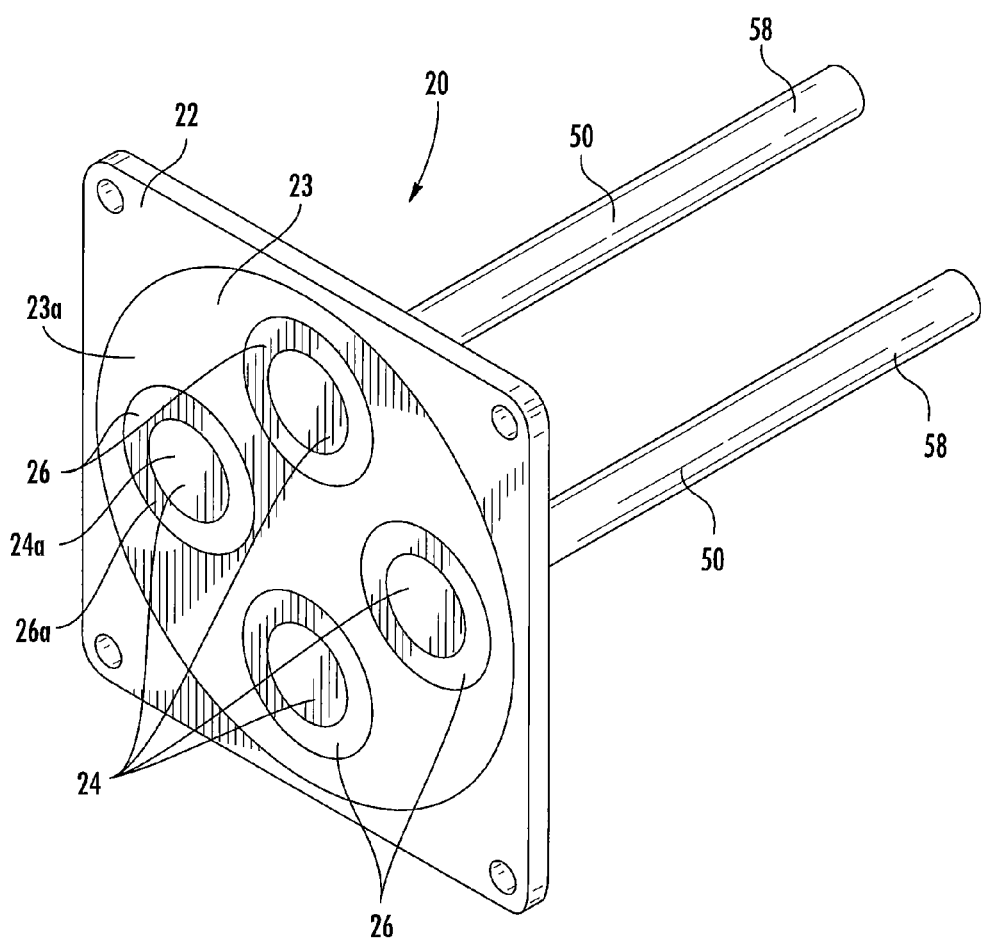
FIG. 1 is a perspective view of a connector and attached cables according to embodiments of the present invention.

Referring now to FIG. 1, the connector 20 is illustrated therein. The connector 20 includes a generally square common base 22 with a circular central portion 23. Within the central portion 23 are four contact pads 24 encircled by dielectric pads 26. The central portion 23 has a facing surface 23a, the contact pads have facing surfaces 24a, and the dielectric pads 26 have facing surfaces 26a. The facing surfaces 23a, 24a, 26a are all substantially coplanar. Each of the contact pads 24 is connected with a respective coaxial cable 50 comprising an inner conductor 52, a dielectric layer 54, an outer conductor 56 and a jacket 58 (see FIG. 4).

Figure 4A:
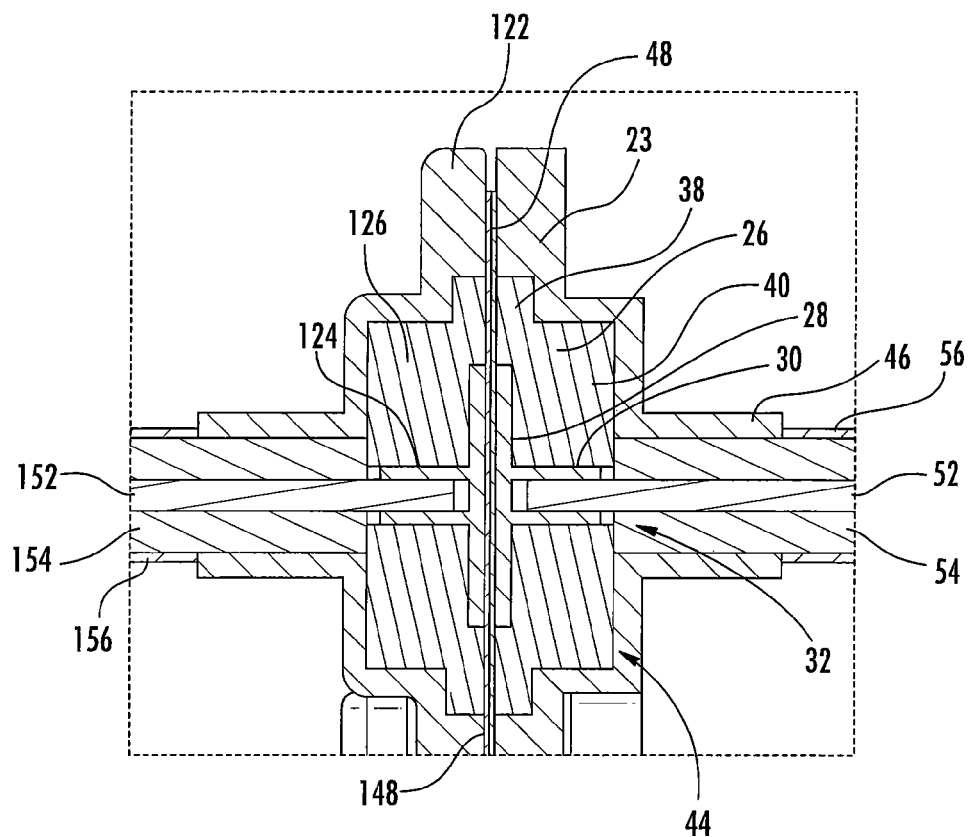
FIG. 4A is an enlarged section view taken from FIG. 4.

As can be seen in FIGS. 4 and 4A, each of the contact pads 24 has a disk-shaped main body 28 and a circular boss 30 that extends generally normal thereto. The bore 32 in the boss 30 is configured to receive and be electrically connected with the inner conductor 52 of a respective coaxial cable 50. Each of the contact pads 24 is embedded in a respective dielectric pad 26. Each dielectric pad 26 has a stepped profile, with a wider ring 38 within which the main body 28 lies and a narrower ring 40 that encircles the boss 30. The dielectric layer 54 of the coaxial cable 50 meets the end of the narrower ring 40, thereby electrically isolating the inner conductor 52 and the contact pad 24 from, respectively, the outer conductor 56 and the central portion 23 of the common base 22.

The central portion 23 of the connector 20 includes four stepped pockets 44 within which the dielectric pads 26 (and, in turn, the contact pads 24) are embedded. As used herein, the word "embedded" means that some portion of one component or structure is positioned within and below the surface of another component or structure. A circular boss 46 extends from each pocket 44 to contact and electrically connect with the outer conductor 56 of the coaxial cable 50. Thus, the central portion 23 of the common base 22 is electrically and commonly connected to all of the outer conductors 56 of the coaxial cables 50.

The contact pads 24 and central portion 23 are formed of an electrically conductive material. Exemplary materials for the contact pads 24 and the central portion 23 are copper, brass and bronze.

Referring still to FIGS. 4 and 4A, a dielectric layer or coating 48 overlies the facing surfaces 23a, 24a, 26a of the central portion 23, the contact pads 24 and the dielectric pads 26. The dielectric layer 48 is typically between about 0.001 and 0.004 inches in thickness and is formed of a dielectric material such as polyester film.

Figure 2:
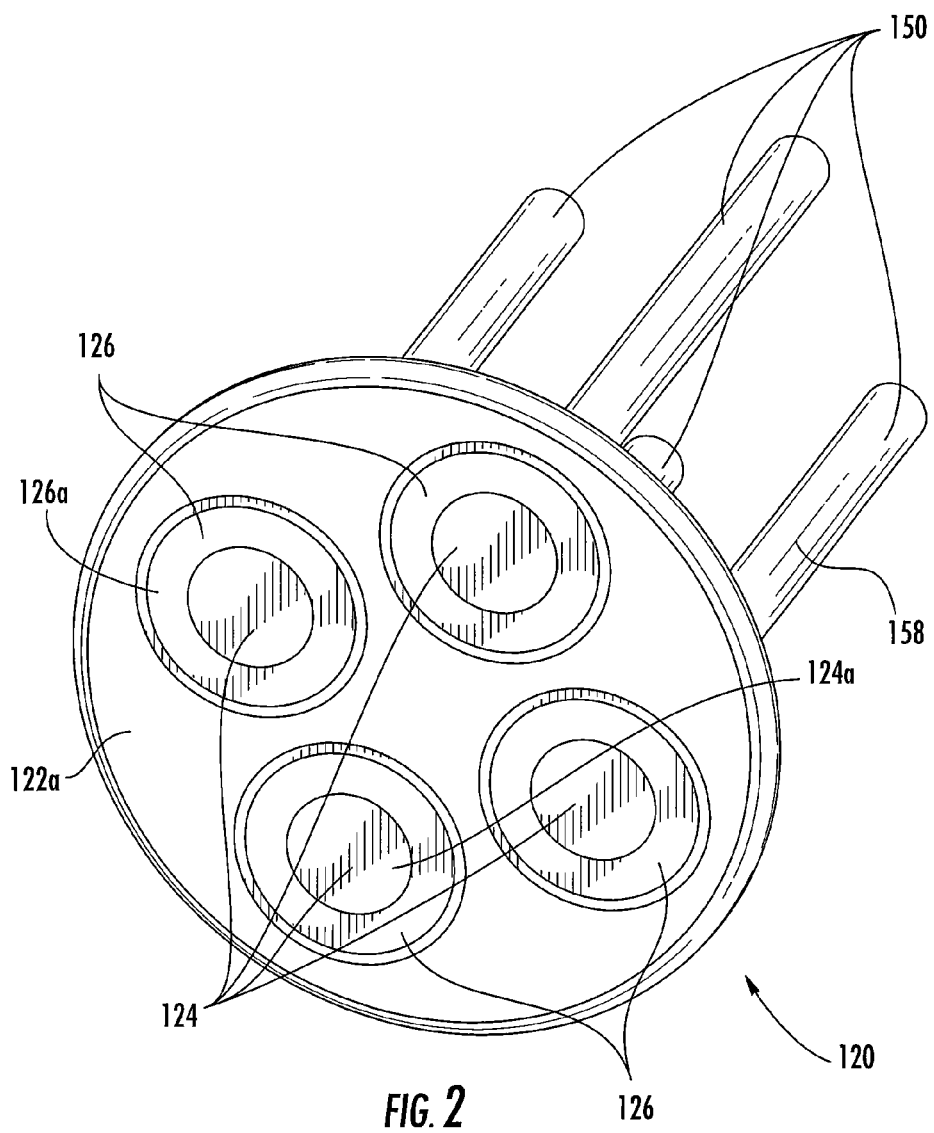
FIG. 2 is a perspective view of a connector configured to mate with the connector of FIG. 1 along with cables attached to the connector.

The second connector 120 is similar in many respects to the connector 20: it has four contact pads 124 embedded within a common base 122, each of which is encircled by a respective dielectric pad 126 (see FIG. 2). The contact pads 124 and the base 122 are connected to respective coaxial cables 150, with the inner conductors 152 of the coaxial cables 150 being electrically connected to the contact pads 124, and the outer conductors 156 of the coaxial cables 150 being electrically connected to the common base 122 (see FIG. 4). The common base 122 of the connector 120 is circular and sized to match the central portion 23 of the connector 20. A dielectric layer 148 overlies the facing surfaces 124a of the contact pads 124, the facing surfaces 126a of the dielectric pads 126, and the facing surface 122a of the common base 122 (see FIGS. 2 and 4A).

Figure 3:
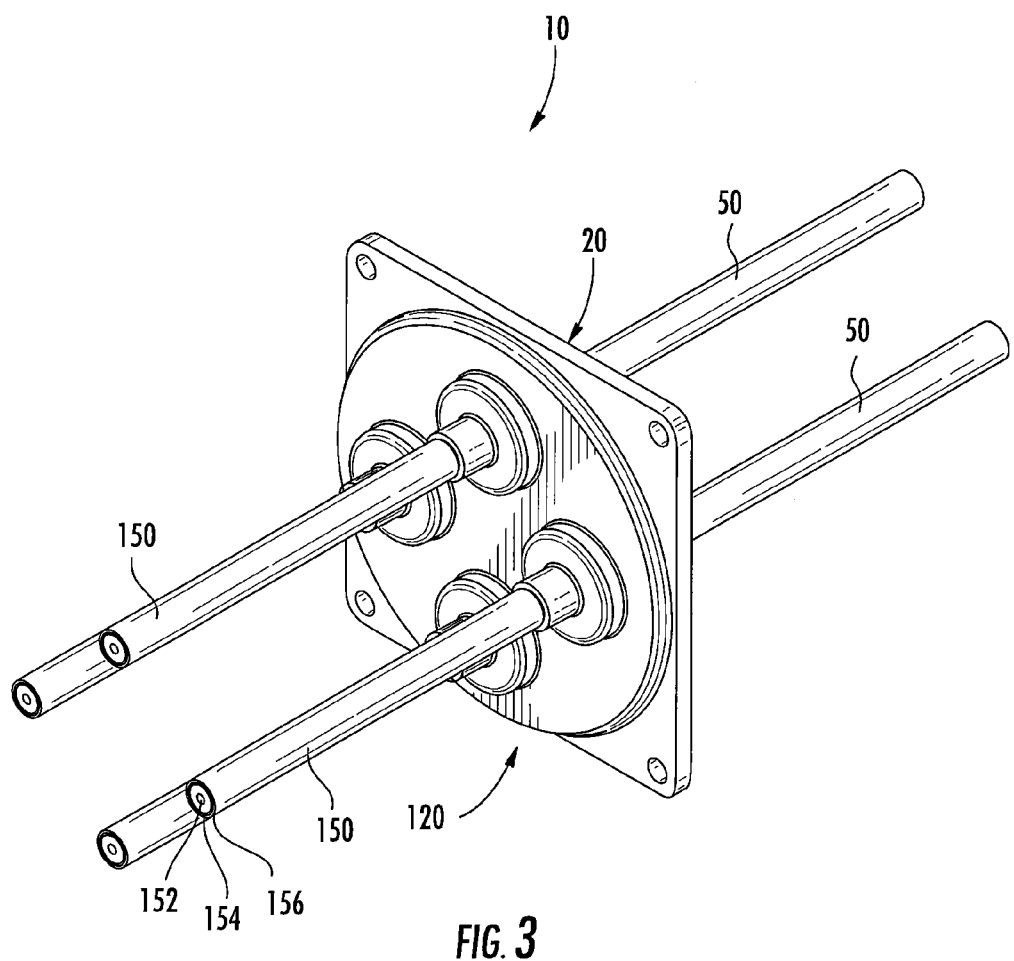
FIG. 3 is a perspective view of an assembly comprising the connector of FIG. 1 mated with the connector of FIG. 2 and attached cables.

As is shown in FIGS. 3 and 4, the connector 20 and the connector 120 can be mated to provide a capacitively coupled interconnection between the coaxial cables 20 and the coaxial cables 120. Each of the contact pads 24 of the connector 20 aligns with a corresponding contact pad 124 of the connector 120, such that their facing surfaces 24a, 124a confront each other, separated by the dielectric layers 48, 148, to form a capacitively coupled interface. Similarly, each of the dielectric pads 26 aligns with a corresponding dielectric pad 126, such that their facing surfaces 26a, 126a confront each other, separated by the dielectric layers 48, 148.

Figure 5:
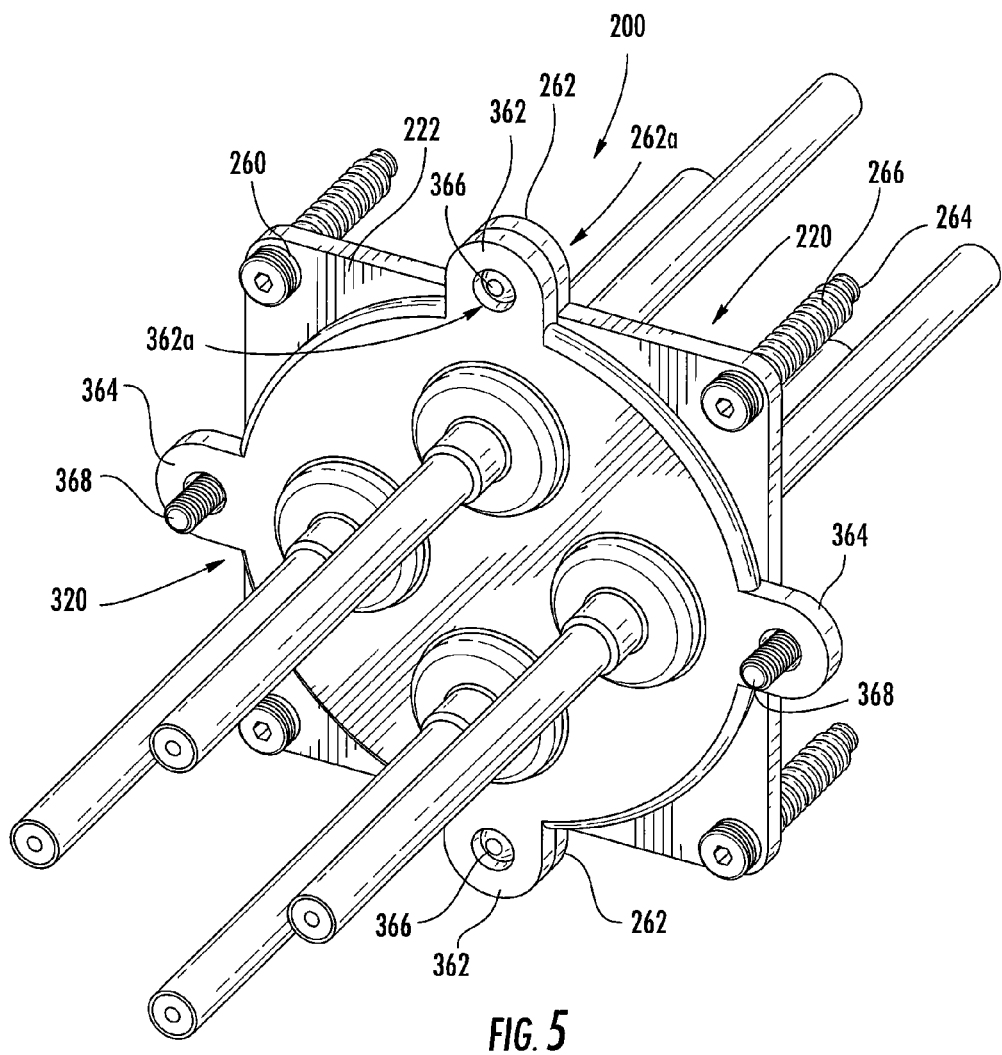
FIG. 5 is a perspective view of another embodiment of an assembly according to embodiments of the present invention.

Referring now to FIG. 5, an assembly 200 comprising a first connector 220 and a second connector 320 is shown therein. The connector 220 is identical to the connector 20 of FIG. 1 with the exception that it includes two ears 262 (with alignment holes 262a) extending outwardly from opposed top and bottom edges. Shoulder bolts 264 can be inserted through the holes 260 (located in the corners of the common base 222) to attach the connector 220 to a panel or other structure. As shown, compression springs 266 may be inserted onto the shoulder bolts 264 to allow the connector 220 to "float" relative to the connector 320 during mating. The connector 320 is identical to the connector 120 with the exception that it has two ears 362 on opposite top and bottom edges and two additional ears 364 extending from opposite side edges. The ears 362 have alignment holes 362a that align with the alignment holes 262a in the ears 262 of the connector 260. A non-conductive alignment pin 270 can be press-fit into the holes 262a with minimal clearance with respect to holes 362a to correctly orient the connectors 262, 362 relative to each other and to maintain alignment. The connector 320 is mounted to a structure such as a panel via bolts 368 inserted through holes 364a in the ears 364.

Those skilled in this art will appreciate that connectors according to embodiments of the invention may have more or fewer contact pads and dielectric pads than are shown herein; for example, a connector may have as few as one contact pad and one dielectric pad embedded in the base. Additionally, although the contact pads and dielectric pads are shown as being circular, other shapes (e.g., square, oval, rectangular, triangular, hexagonal, etc.) may also be employed. In the illustrated embodiment, the central portion of the common base and the contact pads are substantially coplanar, but in some embodiments may be slightly offset from each other. Also, in the illustrated embodiment, the contact surfaces of the common base and the contact pads are substantially flat, but in other embodiments they may be arcuate or otherwise non-flat.

Also, it should be understood that, although a coaxial cable is illustrated herein as being attached to the connectors, other types of cables, such as stripline cables and microstrip transmission lines, may also be employed. One or both connectors may be mounted to a structure, such as the panel of an item of electronic equipment, that includes multiple connections in a ganged configuration.

Further, although the connectors shown herein have their own overlying dielectric layers, in some embodiments only one of the connectors may have a dielectric layer overlying the contact pads and contact base, wherein the mating connector has no overlying dielectric layer. Such an arrangement can still provide a capacitively coupled interface between the connectors.

In addition, the manner in which mating connectors are maintained in contact may vary. For example, hooks, latches and the like may be employed to hold mating connectors in position.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A connector for a plurality of coaxial cables, comprising:
   a conductive common base with a contact surface;
   a plurality of conductive contact pads embedded in the common base, each of the plurality of contact pads having a contact surface; and
   a plurality of dielectric pads embedded in the common base, each of the dielectric pads surrounding a respective contact pad to isolate the respective contact pad from the common base;
   wherein the common base contact surface and contact pad contact surfaces underlie a dielectric layer that is attached to and movable with the connector.

2. The connector defined in claim 1, wherein the common base contact surface and the contact pad contact surfaces are substantially coplanar.

3. The connector defined in claim 1, wherein the common base contact surface and the contact pad contact surfaces are substantially flat.

4. The connector defined in claim 1, further comprising a plurality of coaxial cables, each of the coaxial cables connected with a respective contact pad and with the common base.

5. An assembly of coaxial cable connectors, comprising:
   (a) a first connector, comprising:
   a first conductive common base with a contact surface;
   a plurality of first conductive contact pads embedded in the first common base, each of the plurality of first contact pads having a contact surface; and
   a plurality of first dielectric pads embedded in the first common base, each of the first dielectric pads surrounding a respective first contact pad to isolate the respective first contact pad from the first common base;
   (b) a second connector, comprising:
   a second conductive common base with a contact surface;
   a plurality of second conductive contact pads embedded in the second common base, each of the plurality of second contact pads having a contact surface; and
   a plurality of second dielectric pads embedded in the second base, each of the second dielectric pads surrounding a respective second contact pad to isolate the respective contact pad from the second common base; and
   (c) a dielectric layer overlying the first common base and plurality of first contact pads, the dielectric layer being attached to and movable with the first connector;
   (d) wherein the first connector and the second connector are arranged such that the contact surface of the first common base confronts the contact surface of the second common base separated by the dielectric layer, and each of the contact surfaces of the first contact pads confronts a respective contact surface of the second contact pads separated by the dielectric layer.

6. The assembly defined in claim 5, wherein the dielectric layer is a first dielectric layer, and further comprising a second dielectric layer overlying the second common base and the plurality of second contact pads.

7. The assembly defined in claim 5, wherein the first common base contact surface and the first contact pad contact surfaces are substantially coplanar, and wherein the second common base contact surface and the second contact pad contact surfaces are substantially coplanar.

8. The assembly defined in claim 5, wherein the first common base contact surface and the first contact pad contact surfaces are substantially flat, and wherein the second common base contact surface and the second contact pad contact surfaces are substantially flat.

9. The assembly defined in claim 5, further comprising a plurality of coaxial cables, each of the coaxial cables connected with (a) a respective first contact pad and the first common base, or (b) a respective second contact pad and the second common base.

10. A connector for a plurality of coaxial cables, comprising:
 a conductive common base with a generally flat contact surface;
 a plurality of contact pads embedded in the common base, the contact pads having a generally flat contact surface; and
 a plurality of dielectric pads embedded in the base, each dielectric pad surrounding a respective contact pad to isolate the contact pad from the base; and
 a dielectric layer that overlies the contact surface of the base and the contact surface of the contact pads;
 further comprising a plurality of coaxial cables, each of the coaxial cables connected with a respective contact pad and with the common base, each of the coaxial cables including an inner conductor that fits within a boss of the contact pad and an outer conductor that contacts the common base.

11. The connector defined in claim 10, wherein the contact surface of the base and the contact surface of the contact pad are substantially coplanar.

12. The connector defined in claim 10, further comprising a coaxial cable connected with the contact pad and with the common base.

13. An assembly of coaxial cable connectors, comprising:
 (a) a first connector, comprising:
 a first conductive base with a contact surface;
 a plurality of first conductive contact pads embedded in the first base, the first contact pads having a generally flat contact surface; and
 a plurality of first dielectric pads embedded in the first base, each first dielectric pad surrounding a respective first contact pad to isolate the first contact pad from the first base;
 (b) a second connector, comprising:
 a second conductive base with a contact surface;
 a plurality of second conductive contact pads embedded in the second base, the plurality of second contact pads having a generally flat contact surface; and
 a plurality of second dielectric pads embedded in the second base, each second dielectric pad surrounding a respective second contact pad to isolate the second contact pad from the second base; and
 (c) a dielectric layer overlying the first base and the first contact pads;
 wherein the first connector and the second connector are arranged such that the contact surface of the first base confronts the contact surface of the second base separated by the dielectric layer, and the contact surface of each first contact pad confronts the contact surface of a respective second contact pad separated by the dielectric layer;
 wherein the first and second connectors include alignment features that engage when the connectors are mated.

14. The assembly defined in claim 13, wherein the dielectric layer is a first dielectric layer, and further comprising a second dielectric layer overlying the second base and the second contact pad.

15. The assembly defined in claim 13, wherein the first base contact surface and the first contact pad contact surface are substantially coplanar, and wherein the second base contact surface and the second contact pad contact surface are substantially coplanar.

* * * * *